(12) United States Patent
Zheng et al.

(10) Patent No.: US 12,082,018 B2
(45) Date of Patent: Sep. 3, 2024

(54) COMMUNICATION METHOD AND RELATED DEVICE

(71) Applicant: HUAWEI TECHNOLOGIES CO., LTD., Guangdong (CN)

(72) Inventors: Lili Zheng, Shanghai (CN); Haiyan Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 383 days.

(21) Appl. No.: 17/671,307

(22) Filed: Feb. 14, 2022

(65) Prior Publication Data

US 2022/0167195 A1 May 26, 2022

Related U.S. Application Data

(63) Continuation of application No. PCT/CN2019/100623, filed on Aug. 14, 2019.

(51) Int. Cl.
*H04B 17/20* (2015.01)
*H04W 24/08* (2009.01)
(Continued)

(52) U.S. Cl.
CPC .......... *H04W 24/08* (2013.01); *H04B 17/252* (2023.05); *H04B 17/255* (2023.05);
(Continued)

(58) Field of Classification Search
CPC ...... H04B 17/0082–409; H04J 11/0069–0093; H04L 5/0001–0098;
(Continued)

(56) References Cited

U.S. PATENT DOCUMENTS

| 2009/0046641 | A1 | 2/2009 | Wang et al. |
| 2011/0009117 | A1* | 1/2011 | Breuer ............... H04W 36/0088 |
| 2021/0226750 | A1* | 7/2021 | Cheng .................. H04W 24/10 |

FOREIGN PATENT DOCUMENTS

| CN | 108541032 A | 9/2018 |
| CN | 108632869 A | 10/2018 |

(Continued)

OTHER PUBLICATIONS

Huawei, HiSilicon, "Further discussion on gap sharing," 3GPP TSG-RAN WG4 Meeting AH-1807 LTE/NR perf, R4-1809015, Montreal, Canada, Jul. 2-6, 2018, 4 pages (Year: 2018).*

(Continued)

*Primary Examiner* — Timothy J Weidner
(74) *Attorney, Agent, or Firm* — Fish & Richardson P.C.

(57) ABSTRACT

The present disclosure relates to communication methods and devices. One example method includes sending, by a first network device, a first parameter to a second network device, where the first parameter is used to indicate a proportion of measurement gap sharing between different measurement types. The first network device has a radio link control layer function, a media access control layer function, and a physical layer function. The second network device has a packet data convergence protocol layer function, a service data adaptation protocol layer function, and a radio resource control layer function.

11 Claims, 3 Drawing Sheets

(51) Int. Cl.

| | | |
|---|---|---|
| *H04W 24/10* | (2009.01) | |
| *H04W 36/00* | (2009.01) | |
| *H04W 72/27* | (2023.01) | |
| *H04W 72/50* | (2023.01) | |
| *H04W 84/02* | (2009.01) | |
| *H04W 88/02* | (2009.01) | |
| *H04W 88/08* | (2009.01) | |
| *H04W 88/12* | (2009.01) | |
| *H04W 92/02* | (2009.01) | |
| *H04W 92/10* | (2009.01) | |
| *H04W 92/12* | (2009.01) | |
| *H04W 92/20* | (2009.01) | |

(52) U.S. Cl.
CPC ....... *H04W 24/10* (2013.01); *H04W 36/0088* (2013.01); *H04W 36/0094* (2013.01); *H04W 72/27* (2023.01); *H04W 72/535* (2023.01); *H04W 84/02* (2013.01); *H04W 88/02* (2013.01); *H04W 88/08* (2013.01); *H04W 88/12* (2013.01); *H04W 92/02* (2013.01); *H04W 92/10* (2013.01); *H04W 92/12* (2013.01); *H04W 92/20* (2013.01)

(58) Field of Classification Search
CPC ..... H04W 8/22–245; H04W 16/02–16; H04W 24/02–10; H04W 28/02–26; H04W 36/0005–385; H04W 72/02–569; H04W 76/10–50; H04W 84/02–16; H04W 88/02–14; H04W 92/02–045; H04W 92/10–16; H04W 92/20–24
See application file for complete search history.

(56) References Cited

FOREIGN PATENT DOCUMENTS

| | | |
|---|---|---|
| CN | 109246746 A | 1/2019 |
| CN | 109391983 A | 2/2019 |
| CN | 109412771 A | 3/2019 |
| CN | 110035472 A | 7/2019 |
| CN | 110035563 A | 7/2019 |
| WO | 2019029661 A1 | 2/2019 |
| WO | 2019098928 A1 | 5/2019 |

OTHER PUBLICATIONS

3GPP TR 38.803 V0.2.0 (Oct. 2016), "3rd Generation Partnership Project; Technical Specification Group Radio Access Network; Study on New Radio Access Technology; RF and co-existence aspects (Release 14)," Oct. 2016, 44 pages.
3GPP TS 38.133 V16.0.0 (Jun. 2019), "3rd Generation Partnership Project; Technical Specification Group Radio Access Network; NR; Requirements for support of radio resource management(Release 16)," Jun. 2019, 1002 pages.
3GPP TS 38.215 V15.5.0 (Jun. 2019), "3rd Generation Partnership Project; Technical Specification Group Radio Access Network; NR; Physical layer measurements(Release 15)," Jun. 2019, 16 pages.
3GPP TS 38.300 V15.6.0 (Jun. 2019), "3rd Generation Partnership Project; Technical Specification Group Radio Access Network; NR; NR and NG-RAN Overall Description; Stage 2(Release 15)," Jun. 2019, 99 pages.
3GPP TS 38.331 V15.6.0 (Jun. 2019), "3rd Generation Partnership Project; Technical Specification Group Radio Access Network; NR; Radio Resource Control (RRC) protocol specification(Release 15)," Jun. 2019, 519 pages.
3GPP TS 38.473 V15.6.0 (Jul. 2019), "3rd Generation Partnership Project; Technical Specification Group Radio Access Network; NG-RAN; F1 application protocol (F1AP)(Release 15)," Jul. 2019, 220 pages.
Huawei, HiSilicon, "Further discussion on gap sharing," 3GPP TSG-RAN WG4 Meeting AH-1807 LTE/NR perf, R4-1809015, Montreal, Canada, Jul. 2-6, 2018, 4 pages.
Huawei, HiSilicon, "Overview on gap sharing and SMTC colliding," 3GPP TSG-RAN WG4 Meeting #86bis, R4-1804756, Melbourne, AU, Apr. 16-20, 2018, 4 pages.
PCT International Search Report and Written Opinion issued in International Application No. PCT/CN2019/100623 on May 11, 2020, 15 pages (with English translation).
CMCC, "Assistance Information for EN-DC and NG-EN DC Gap Configuration," 3GPP TSG RAN WG2 #105, R2-1901956, Athens, Greece, Feb. 25-Mar. 1, 2019, 3 pages.
Office Action in Japanese Appln. No. 2022-509125, dated Mar. 20, 2023, 9 pages (with English translation).
CATT, "Considerations on Transmitting SMTC info from CU to DU," 3GPP TSG-RAN WG2 Meeting #102, R2-1806725, Busan, Korea, May 21-25, 2018, 3 pages.
CATT, "[Draft] LS on RRC Information from gNB-DU to gNB-CU," 3GPP TSG-RAN3#99bis, R3-181794, Sanya, China, Apr. 16-20, 2018, 1 page.
Ericsson, "Gap sharing and scaling factor for gap-based measurement," 3GPP TSG-RAN WG4 Meeting #87, R4-1806237, Busan, Korea, May 21-25, 2018, 4 pages.
Ericsson, "Measurement configuration for EN-DC," 3GPP TSG RAN WG3 #99bis, Tdoc R3-182255, Sanya, China, Apr. 16-20, 2018, 3 pages.
Extended European Search Report issued in European Application No. 19941443.4 on Jul. 28, 2022, 8 pages.
Nokia et al., "Discussion on MG sharing," 3GPP TSG-RAN WG4 Meeting #87, R4-1806637, Busan, Korea, May 21-25, 2018, 2 pages.
NTT DOCOMO, Inc., "The principle of defining gap sharing factor among NR intra/inter-frequency and inter-RAT measurements," 3GPP TSG RAN WG4 Meeting #87, R4-1806388, Busan, Korea, May 21-25, 2018, 4 pages.
Office Action issued in Chinese Application No. 201980098137.6 on Jul. 26, 2022, 20 pages (with English translation).
Samsung, "Discussion on Gap Sharing for UE Measurements in NE-DC,"3GPP TSG-RAN WG4 Meeting #90b, R4-1903354, Xi'an, China, Apr. 8-12, 2019, 4 pages.
Samsung, "Discussion on Gap Sharing for UE Measurements in NR-DC," 3GPP TSG-RAN WG4 Meeting #90b, R4-1903356, Xi'an, China, Apr. 8-12, 2019, 4 pages.
ZTE Corporation et al., "CR for gap configuration SetupRelease in CG-ConfigInfo," 3GPP TSG-RAN WG2 Meeting #101bis, R2-1806430, Sanya, China Apr. 16-20, 2018, 4 pages.
ZTE, "Discussion on Measurement Gap Configuration for MR-DC," 3GPP TSG-RAN WG3 #103, R3-190395, Athens, Greece, Feb. 25-Mar. 1, 2019, 2 pages.

* cited by examiner

COMMUNICATION METHOD AND RELATED DEVICE

CROSS-REFERENCE TO RELATED APPLICATIONS

This application is a continuation of International Application No. PCT/CN2019/100623, filed on Aug. 14, 2019. The disclosure of the aforementioned application is hereby incorporated by reference in its entirety.

TECHNICAL FIELD

This application relates to the field of communication technologies, and more specifically, to a measurement parameter transferring method and a related device.

BACKGROUND

Measurement configuration is one of measurement steps in a wireless communication system. In a measurement configuration phase, a network sends information required for measurement to UE by using a measurement configuration message through signaling. After receiving the signaling, the UE correspondingly modifies a measurement configuration database and a measurement report list that are of the UE, and notifies the network of a modification succeed message. The measurement configuration message may include a measurement gap and measurement gap sharing.

A central unit (CU) and a distributed unit (DU) exist in fifth-generation (5G) communication. A network device (such as a gNodeB) may be divided, based on a protocol layer, into at least one distributed unit and at least one central unit connected to the at least one distributed unit. In a possible division manner, the distributed unit may include a radio link control (RLC) layer function, a medium access control (MAC) layer function, and a physical (PRY) layer function. The central unit may include a packet data convergence protocol (PDCP) layer function, a service data adaptation protocol (SDAP) layer function, and a radio resource control (RRC) layer function. A network architecture formed by the CU and the DU may be referred to as a CU-DU architecture. In another design, functions of the CU or the may alternatively be obtained through division based on a service type or another system requirement. For example, division is performed based on a latency, functions whose processing time needs to satisfy a latency requirement are deployed on the DU, and functions whose processing time does not need to satisfy the latency requirement are deployed on the CU.

In a currently existing CU-DU architecture, how the CU obtains a gap sharing parameter is not specified. Consequently, a terminal device may be unable to accurately obtain the gap sharing parameter in time.

SUMMARY

A measurement parameter is a parameter related to scheduling, and a MAC layer is responsible for scheduling. Therefore, a DU can accurately determine a gap sharing parameter in time. In view of this, this application provides a measurement parameter transferring method and a related device. According to the method, a CU can accurately obtain the gap sharing parameter in time.

According to a first aspect, this application provides a communication method. The method may include: sending, by a first network device, a first parameter to a second network device, where the first parameter is used to indicate a proportion of measurement gap sharing between different measurement types. The first network device has a radio link control layer function, a media access control layer function, and a physical layer function. The second network device has a packet data convergence protocol layer function, a service data adaptation protocol layer function, and a radio resource control layer function. According to the method, the second network device can accurately obtain a measurement gap sharing parameter in time.

In a feasible design, the measurement type may include any one of the following: intra-frequency measurement, inter-frequency measurement, inter-RAT measurement, and reference signal time difference measurement.

In a feasible design, the first network device sends the first parameter to the second network device by using a terminal device context setup response message.

According to a second aspect, this application provides a communication method. The method may include: receiving, by a second network device, a first parameter from a first network device, where the first parameter is used to indicate a proportion of measurement gap sharing between different measurement types; and sending, by the second network device, the first parameter to a terminal device. The first network device has a radio link control layer function, a media access control layer function, and a physical layer function. The second network device has a packet data convergence protocol layer function, a service data adaptation protocol layer function, and a radio resource control layer function. According to the method, the second network device can accurately obtain a measurement gap sharing parameter in time, and the terminal device can accurately obtain the measurement gap sharing parameter in time.

In a feasible design, the sending, by the second network device, the first parameter to a terminal device includes: the first parameter is carried in a radio resource control reconfiguration message.

According to a third aspect, this application provides a first network device. The first network device may include: a sending module, configured to send a first parameter to a second network device, where the first parameter is used to indicate a proportion of measurement gap sharing between different measurement types. The first network device has a radio link control layer function, a media access control layer function, and a physical layer function. The second network device has a packet data convergence protocol layer function, a service data adaptation protocol layer function, and a radio resource control layer function.

In a feasible design, the measurement type includes any one of the following: intra-frequency measurement, inter-frequency measurement, inter-RAT measurement, and reference signal time difference measurement.

In a feasible design, the first parameter may be carried in any one of the following messages: a terminal device context setup response message, a terminal device context modification response, and a terminal device context modification request.

According to a fourth aspect, this application provides a second network device. The second network device may include: an obtaining module, configured to receive a first parameter from a first network device, where the first parameter is used to indicate a proportion of measurement gap sharing between different measurement types; and a sending module, configured to send the first parameter to a terminal device. The first network device has a radio link control layer function, a media access control layer function, and a physical layer function. The second network device has a packet data convergence protocol layer function, a service data adaptation protocol layer function, and a radio resource control layer function. In a feasible design, the first parameter may be carried in a radio resource control reconfiguration message.

According to a fifth aspect, this application provides a communication apparatus, and the communication apparatus may include at least one processor and a power supply circuit. The power supply circuit is configured to supply power to the processor, and related program instructions are executed in the at least one processor, so that the communication apparatus implements the method in the first aspect or the second aspect and any design of the method. The communication apparatus may be the terminal device, the network device, or a chip in the terminal device or the network device in the method in the first aspect or the second aspect and in any design of the method. Optionally, the communication apparatus may further include at least one memory, and the memory stores the related program instructions.

According to a sixth aspect, this application provides a chip, and the chip may be applied to a communication apparatus. The chip includes at least one processor and a power supply circuit. The power supply circuit is configured to supply power to the processor, and related program instructions are executed in the at least one processor, so that the communication apparatus implements the method in the first aspect or the second aspect and any design of the method. Optionally, the chip may further include at least one memory, and the memory stores the related program instructions.

According to a seventh aspect, this application provides a computer storage medium, and the computer storage medium may be applied to a communication apparatus. The computer-readable storage medium stores related program instructions, and when the related program instructions are run, the communication apparatus is enabled to implement the method in the first aspect or the second aspect and any design of the method.

According to an eighth aspect, this application provides a computer program product. The computer program product includes related program instructions, and when the related program instructions are executed, the method in the first aspect or the second aspect and any design of the method are implemented.

According to a ninth aspect, this application provides a communication system, and the system may include the first network device in the third aspect and the second network device in the fourth aspect.

BRIEF DESCRIPTION OF DRAWINGS

The accompanying drawings, which may be included in this specification and constitute a part of this specification, together with this specification show example embodiments, or features and aspects of this application, and are used to explain principles of this application. It is clear that the accompanying drawings in the following descriptions merely show some embodiments of this application, and a person of ordinary skill in the art can derive other drawings from these accompanying drawings without creative efforts.

DESCRIPTION OF EMBODIMENTS

In the descriptions of this application, terms such as "first" or "second" are merely used for distinction and description, and cannot be understood as an indication or implication of relative importance, or as an indication or implication of an order. In this application, for network devices with different numbers, such as "a first network device", the numbers are merely used for convenience in description of context, and different sequence numbers do not have specific technical meanings. For example, the first network device and a second network device may be understood as one or any one of a series of network devices. For example, a function of a numbered network device may be determined by using context content of the numbered network device, and/or may be determined by using a function of information carried in the numbered network device. In specific implementation, network devices with different numbers may be a same network device or a same type of network device. This is not limited in this application.

Terms such as "operation 201" or "operation 202" in this application are merely used for distinction and description, and cannot be understood as an indication or implication of relative importance of an operation, or as an indication or implication of an execution sequence of an operation.

The term "and/or" in this application describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

In this application, "at least one" refers to one or more, and "a plurality of" refers to two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between the associated objects. "At least one item (piece) of the following" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In this application, "transmission" may include the following three cases: data sending, data receiving, or data sending and data receiving. That is, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission.

In this application, the terms "may include", "have", and any other variants are intended to cover the non-exclusive inclusion, for example, a process, method, system, product, or device that includes a list of steps or units is not necessarily limited to those steps or units that are clearly listed, but may include other steps or units not clearly listed or inherent to the process, method, product, or device.

The following describes technical solutions of this application with reference to the accompanying drawings. For example, features or content marked by dashed lines in the accompanying drawings in the embodiments of this application may be understood as optional operations or optional structures of the embodiments.

Figure 1:
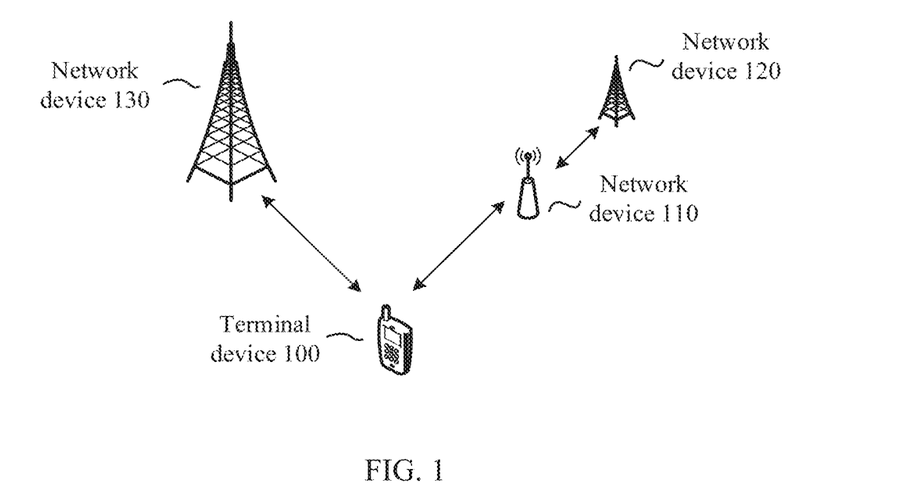
FIG. 1 is a schematic diagram of a possible communication system according to this application.

The solutions provided in the embodiments of this application are applicable to a communication system shown in FIG. 1. The communication system may be configured to implement communication between a terminal device and a network device, and may be the following various communication systems, for example, a global system for mobile communications (GSM) system, a code division multiple access (CDMA) system, a wideband code division multiple access (WCDMA) system, a general packet radio service (GPRS), a Long Term Evolution (LTE) system, an LTE frequency division duplex (FDD) system, LTE time division duplex (TDD), a universal mobile telecommunications system (UMTS), a worldwide interoperability for microwave access (WiMAX) communication system, or a new radio (NR) system in a fifth-generation (5th generation, 5G) mobile communication system, and another network system that can be configured to provide a mobile communication service. This is not limited in this application.

As shown in FIG. 1, the communication system may include a terminal device 100, a network device 110, a network device 120, and a network device 130. The terminal device 100 and the network device may communicate with each other through a wireless communication interface (for example, an LTE air interface or an NR air interface). The first network device, the second network device, and the third network device may communicate with each other in a wired manner (for example, the devices are connected through an optical fiber), may communicate with each other in a wireless manner (for example, the devices are connected through microwave), or may communicate with each other by using a core network device. It should be noted that the network architecture shown in FIG. 1 is merely an example architectural diagram. Although not shown, in addition to the network function entities shown in FIG. 1, the network shown in FIG. 1 may further include another function entity, for example, a core network element. This is not limited.

As shown in FIG. 1, the terminal device 100 may usually refer to a device that has a capability of communicating with a network device, for example, may be user equipment (UE), an access terminal device, a user unit, a user station, a mobile station, a mobile console, a remote station, a remote terminal device, a mobile device, a user terminal device, a wireless terminal device, a user agent, or a user apparatus. For example, the terminal device may be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device (a smart watch, a smart band, or the like); or may be smart furniture (or a household appliance), a terminal device in a future 5G network, a terminal device in a future evolved public land mobile network (PLMN), a vehicle device in vehicle-to-everything (V2X), customer-premises equipment (CPE), or the like. A specific implementation form of the terminal device is not limited in this embodiment of this application.

As shown in FIG. 1, the network device 110, the network device 120, and the network device 130 may be configured to implement a radio physical entity function, and functions such as resource scheduling and radio resource management, radio access control, and mobility management. For example, the network device may be a radio access network (RAN) device. In this application, a related network device may usually refer to a device that can be configured to communicate with a terminal device, for example, may be a base transceiver station (BTS) in a GSM system or a CDMA system, a NodeB (NB) in a WCDMA system, an evolved NodeB (evolutional nodeB, eNB) in an LTE system, a radio controller in a scenario of a cloud radio access network (CRAN), a relay node station, an access point, a vehicle-mounted device, a road side unit (RSU), a wearable device, a network device in a future 5G network, such as an MR nodeB, a next-generation NodeB (generation nodeB, gNB), a central unit (CU), a distributed unit (DU), or a network device in a future evolved PLMN network. A specific implementation form of the network device is not limited in this embodiment of this application.

Figure 2:
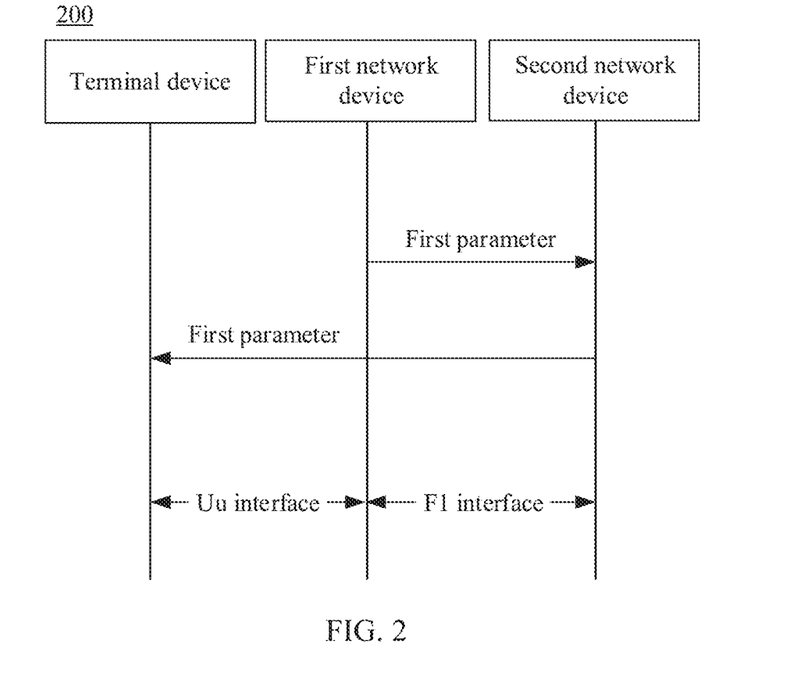
FIG. 2 is a schematic flowchart of a communication method according to an embodiment of this application.

FIG. 2 is a schematic flowchart of a communication method according to this application. The following specifically describes the technical solutions in the embodiments of this application with reference to FIG. 2. For example, the communication method 200 corresponding to FIG. 2 may include the following steps.

Operation 201: A first network device sends a first parameter to a second network device, where the first parameter is used to indicate a proportion of measurement gap sharing between different measurement types.

Optionally, the first network device may be a DU, and the second network device may be a CU. Functions of the CU may be implemented by one entity, or may be implemented by different entities. For example, the functions of the CU may be further divided. For example, a control plane (CP) is separated from a user plane (UP), that is, a control plane of the CU (CU-CP) is separated from a user plane of the CU (CU-UP). For example, the CU-CP and the CU-UP may be implemented by different function entities. The CU-CP and the CU-UP may be coupled to the DU to jointly implement functions of the base station. In another design, the CU may alternatively have one or more functions of a core network. One or more CUs may be disposed in a centralized manner or a separated manner. For example, the CUs may be disposed on a network side for ease of centralized management. The DU may have a plurality of radio frequency functions, and the plurality of radio frequency functions may be remotely set. In this application, an interface for interaction between the CU and the DU may be referred to as an F1 interface. An F1AP message may be used for interaction between the CU and the DU. For example, an existing F1AP message may be a gNB-CU/gNB-DU configuration update message, a gNB-CU/gNB-DU configuration update response (configuration update acknowledge) message, a UE context setup/modification request (user equipment context setup/modification request) message, a UE context setup/modification response (user equipment context setup/modification response) message, a UE context setup/modification required (user equipment context setup/modification required) message, or a UE context release command/request/complete (UE context release command/request/complete) message.

The first parameter may be sent based on a request. For example, the second network device may send a request message to the first network device to request the first parameter. For example, the request message may be included in a terminal device context setup request (UE CONTEXT SETUP REQUEST) message, and the first parameter is included in a terminal device context setup response (UE CONTEXT SETUP RESPONSE) message. For example, the request message may be included in a terminal device context modification request (UE CONTEXT MODIFICATION REQUEST) message, and the first parameter is included in a terminal device context modification response (UE CONTEXT MODIFICATION RESPONSE) message. The first parameter may alternatively be included in the terminal device context modification request (UE CONTEXT MODIFICATION REQUIRED) message.

Optionally, the first parameter is gap sharing. For example, the gap sharing may refer to a proportion of gap sharing between different measurement types, and the gap sharing may be used to determine proportions of measurement gaps allocated to various types of measurement. For example, gap sharing between intra-frequency measurement and inter-frequency measurement that need a gap needs to be considered currently. If a network configures that gap sharing of intra-frequency measurement is 25%, it means that in every four periodic resources of the gap, one periodic resource is used for intra-frequency measurement, and three periodic resources are used for inter-frequency measurement. In a conventional technology, gap sharing has four values, and is represented by 2 bits; and gap sharing and the gap may exist in information element MeasConfig and then placed in new information element MeasGapSharingConfig.

The measurement type may include at least one of the following: intra-frequency measurement, inter-frequency measurement, inter-RAT (inter-RAT) measurement, and reference signal time difference (RSTD) measurement.

Optionally, the first network device and the second network device each may be a radio access network (RAN) device, such as an eNB or a gNB.

In this case, specifically, a gap sharing parameter/configuration may be directly interacted through an X2/Xn interface. The "gap sharing parameter" in this application may also be referred to as the "gap sharing configuration". Specifically, the gap sharing configuration may be information element MeasGapSharingConfig, or may be an inter-node message exchanged in a form of a container. Specifically, the inter-node message may be CG-Config or CG-ConfigInfo defined in the IS 38.331 text in the 3GPP standard.

Operation 202: The second network device sends the first parameter to a terminal device.

For example, the first parameter may be included in a radio resource control reconfiguration (RRC reconfiguration) message.

This embodiment of this application provides a communication method for transferring a gap sharing parameter. In one method, a DU sends a gap sharing parameter to a CU, so that the CU can accurately obtain the gap sharing parameter in time, and finally, a terminal device can accurately obtain the gap sharing parameter in time.

In another method, gap sharing is exchanged between gNodeBs, so that when the gNodeBs exchange a gap configuration, one gNodeB notifies the peer party of a gap sharing parameter determined by the gNodeB, where the gap sharing parameter is used as a reference for effectively performing measurement configuration by the peer party, thereby improving measurement efficiency and reliability of an entire communication system.

Based on the foregoing similar technical concept, an embodiment of this application provides a network device. The network device may be the network device in the communication method provided in each of the foregoing embodiments and in any possible design of the communication method. The network device may include at least one corresponding unit that is in the communication method provided in each of the foregoing embodiments and that is configured to perform a method step, an operation, or behavior performed by the network device. The at least one unit may be disposed in a one-to-one correspondence with the method step, the operation, or the behavior performed by the network device.

Figure 3:
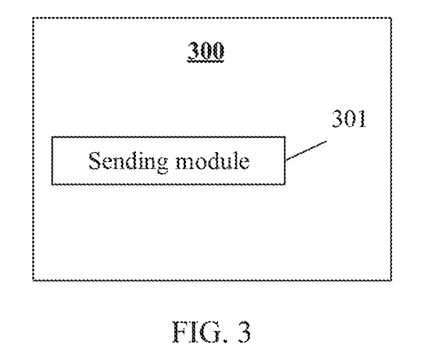
FIG. 3 is a schematic block diagram of a network device according to an embodiment of this application.

For example, a structure and a function of a first network device 300 are specifically described below with reference to FIG. 3 in the embodiments of this application. FIG. 3 is a schematic block diagram of a first network device 300 according to an embodiment of this application.

For example, this application provides a first network device 300, which may include: a sending module 301, configured to send a first parameter to a second network device, where the first parameter is used to indicate a proportion of measurement gap sharing between different measurement types. The first network device has a radio link control layer function, a media access control layer function, and a physical layer function. The second network device has a packet data convergence protocol layer function, a service data adaptation protocol layer function, and a radio resource control layer function.

Optionally, the measurement type includes any one of the following: intra-frequency measurement, inter-frequency measurement, inter-RAT measurement, and reference signal time difference measurement.

Optionally, the first parameter may be carried in any one of the following messages: a terminal device context setup response message, a terminal device context modification response, and a terminal device context modification request.

Figure 4:
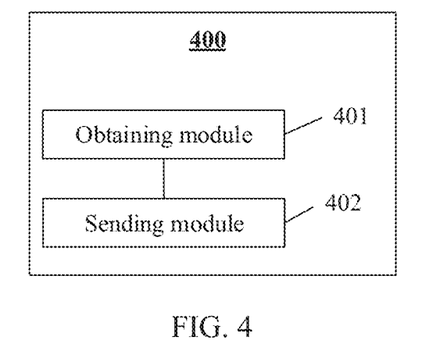
FIG. 4 is a schematic block diagram of a network device according to an embodiment of this application.

For example, a structure and a function of a second network device 400 are specifically described below with reference to FIG. 4 in the embodiments of this application. FIG. 4 is a schematic block diagram of a second network device 400 according to an embodiment of this application.

For example, this application provides a second network device 400, which may include: an obtaining module 401, configured to receive a first parameter from a first network device, where the first parameter is used to indicate a proportion of measurement gap sharing between different measurement types; and a sending module 402, configured to send the first parameter to a terminal device. The first network device has a radio link control layer function, a media access control layer function, and a physical layer function. The second network device has a packet data convergence protocol layer function, a service data adaptation protocol layer function, and a radio resource control layer function.

Optionally, the first parameter may be carried in a radio resource control reconfiguration message.

It should be noted that these module units in the foregoing embodiments may be implemented by a computer program, may be implemented by a hardware circuit, or may be implemented by a computer program in combination with a hardware circuit. For example, a receiving module and the sending module may be implemented by a transceiver apparatus, an interface circuit, or a transceiver; or the receiving module is implemented by an independent receiver, and the sending module is implemented by an independent receiver. A processing module may be implemented by a processor with a data processing function.

Figure 5:
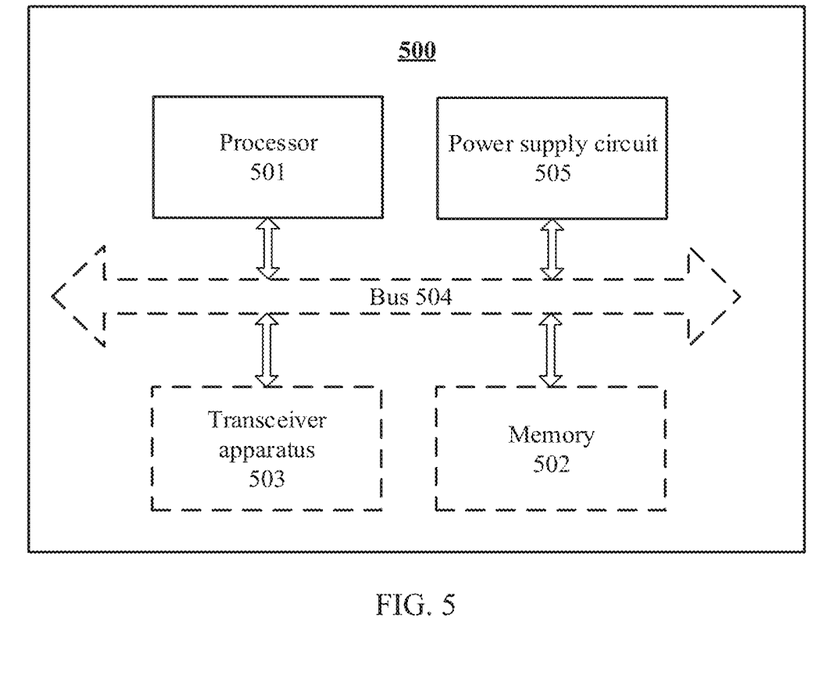
FIG. 5 is a schematic block diagram of a communication apparatus according to an embodiment of this application.

Based on a same technical concept, an embodiment of this application further provides a communication apparatus 500 that may be configured to implement a function performed by any terminal device or any network device in the foregoing method embodiments. A structure and a function of the communication apparatus 500 are specifically described below with reference to FIG. 5 in the embodiments of this application. FIG. 5 is a schematic block diagram of a communication apparatus 500 according to an embodiment of this application. The communication apparatus may include at least one processor 501 and a power supply circuit 505. When related program instructions are executed in the at least one processor 501, the communication apparatus 500 is enabled to implement functions of the first network device or the second network device in the communication method provided in the method 200 and in any design of the communication method. The power supply circuit 505 may be configured to supply power to the processor 501. Optionally, the power supply circuit 505 may be located in a same chip as the processor 501, or may be located in another chip other than a chip in which the processor 501 is located. Optionally, the communication apparatus 500 may further include at least one memory 502, and the memory 502 may be configured to store the related program instructions and/or data that are required for storage. Optionally, the communication apparatus 500 may further include a transceiver apparatus 503. The transceiver apparatus 503 may be used by the communication apparatus 500 to perform communication interaction with another communication device (such as a network device or a terminal device, which is not limited herein), for example, exchanging control signaling and/or service data. The transceiver apparatus 503 may be implemented by a circuit with a communication transceiving function. Optionally, as shown in FIG. 5, the communication apparatus 500 may further include a bus 504. All parts in the communication apparatus 500 may be interconnected through the bus 504.

Figure 6:
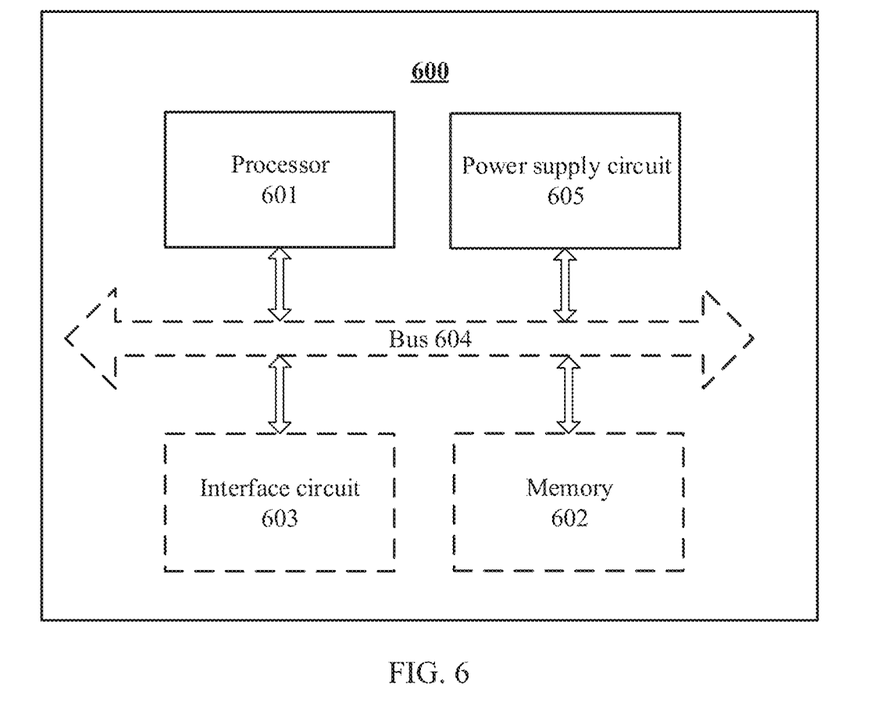
FIG. 6 is a schematic block diagram of a chip according to an embodiment of this application.

Based on the same technical concept, an embodiment of this application provides a chip 600. A structure and a function of the chip 600 are specifically described below with reference to FIG. 6 in the embodiments of this application. FIG. 6 is a schematic block diagram of a chip 600 according to an embodiment of this application. The chip 600 may be applied to any one of the foregoing network devices. Through processing of the chip, the first network device or the second network device is enabled to perform the operation of the first network device or the second network device in the communication method provided in the method 200 in the embodiments of this application and in any possible design solution of the communication method. As shown in FIG. 6, the chip 600 may include at least one processor 601 and a power supply circuit 605. When related program instructions are executed in the at least one processor 601, the operation of the first network device or the second network device in the communication method provided in the method 200 in the embodiments of this application and in any possible design solution of the communication method are implemented. The power supply circuit 605 may be configured to supply power to the processor 601. Optionally, the power supply circuit 605 may be located in a same chip as the processor 601, or may be located in another chip other than a chip in which the processor 601 is located. Optionally, the chip 600 may further include at least one memory 602, and the memory 602 stores the related program instructions. Optionally, the chip 600 may further include an interface circuit 603 and a bus 604. The at least one processor 601, the at least one memory 602, and the interface circuit 603 are coupled to each other through the bus 604. The chip 600 interacts with the terminal device, the first network device, the second network device, or another device in a network by using the interface circuit 603. Optionally, the processor 601 and the memory 602 may be combined into a processing apparatus. For example, in specific implementation, the memory 602 may be integrated into the processor 601 or independent of the processor 601.

It should be understood that, the processor in the embodiments of this application may be a central processing unit (CPU). The processor may further be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory in the embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example, and not limitative descriptions, random access memories (RAM) in many forms may be used, for example, a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The power supply circuit in the embodiments of this application includes but is not limited to at least one of the following: a power supply subsystem, an electrical tube management chip, a power consumption management processor, or a power consumption management control circuit.

The transceiver apparatus, the interface circuit, or the transceiver in the embodiments of this application may include a separate transmitter and/or a separate receiver, or the transmitter and the receiver may be integrated. The transceiver apparatus, the interface circuit, or the transceiver may work under an indication of a corresponding processor. Optionally, the transmitter may be corresponding to a transmitter in a physical device, and the receiver may be corresponding to a receiver in a physical device.

A person skilled in the art may clearly understand that, for the purpose of convenient and brief description, division of the foregoing function modules is merely used as an example for description. In an actual application, the foregoing functions may be allocated to different function modules for implementation based on a requirement. That is, an inner structure of an apparatus is divided into different function modules to implement all or some of the functions described above. For detailed working processes of the foregoing system, apparatus, and unit, refer to corresponding processes in the foregoing method embodiments, and details are not described herein again.

In the embodiments in this application, it should be understood that the disclosed system, apparatus, and method may be implemented in other manners. For example, the described apparatus embodiment is merely an example. For example, the module or unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

In the foregoing embodiments, the descriptions of the embodiments have respective focuses. For a part that is not described in detail in an embodiment, refer to related descriptions in other embodiments.

In the embodiments of this application, the units described as separate components may or may not be physically separate, and components displayed as units may or may not be physical units, may be located in one position, or may be distributed on a plurality of network units. Some or all of the units may be selected based on an actual requirement to achieve the objectives of the solutions in the embodiments in this application.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and may include several instructions for instructing a computer device, for example, a personal computer, a server, or a network device, or a processor to perform all or some of the operations of the methods described in the embodiments of this application. The foregoing storage medium may include any medium or computer storage medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A communication device, which is a first network device or an apparatus included in the first network device, comprising:
    at least one processor; and
    one or more memories coupled to the at least one processor and storing programming instructions for execution by the at least one processor to perform operations comprising:
    sending a first parameter to a second network device, wherein the first parameter is used to indicate a proportion of measurement gap sharing between different measurement types, wherein the first network device has a radio link control layer function, a media access control layer function, and a physical layer function, and wherein the second network device has a packet data convergence protocol layer function, a service data adaptation protocol layer function, and a radio resource control layer function.

2. The device according to claim 1, wherein a measurement type of the different measurement types comprises any one of the following: intra-frequency measurement, inter-frequency measurement, inter-RAT measurement, and reference signal time difference measurement.

3. The device according to claim 1, wherein the first parameter is carried in any one of the following messages sent to the second network device: a terminal device context setup response message, a terminal device context modification response, and a terminal device context modification request.

4. The device according to claim 1, wherein the first network device is a distributed unit (DU) and the second network device is a central unit (CU).

5. A communication device, which is a second network device or an apparatus included in the second network device, comprising:
    at least one processor; and
    one or more memories coupled to the at least one processor and storing programming instructions for execution by the at least one processor to perform operations comprising:
    receiving a first parameter from a first network device, wherein the first parameter is used to indicate a proportion of measurement gap sharing between different measurement types; and
    sending the first parameter to a terminal device, wherein the first network device has a radio link control layer function, a media access control layer function, and a physical layer function, and wherein the second network device has a packet data convergence protocol layer function, a service data adaptation protocol layer function, and a radio resource control layer function.

6. The device according to claim 5, wherein the first parameter is carried in a radio resource control reconfiguration message sent to the terminal device.

7. The device according to claim 5, wherein the first network device is a distributed unit (DU) and the second network device is a central unit (CU).

8. A communication system, wherein the system comprises a first network device and a second network device, wherein the first network device has a radio link control layer function, a media access control layer function, and a physical layer function, and wherein the second network device has a packet data convergence protocol layer function, a service data adaptation protocol layer function, and a radio resource control layer function;
  wherein the first network device comprises:
  at least one first processor; and
  one or more first memories storing programming instructions executable by the at least one first processor to perform one or more first operations comprising:
    sending a first parameter to the second network device, wherein the first parameter is used to indicate a proportion of measurement gap sharing between different measurement types; and
  wherein the second network device comprises:
    at least one second processor; and
    one or more second memories storing programming instructions executable by the at least one second processor to perform one or more second operations comprising:
      receiving the first parameter from the first network device; and
      sending the first parameter to a terminal device.

9. The communication system according to claim 8, wherein a measurement type of the different measurement types comprises any one of the following: intra-frequency measurement, inter-frequency measurement, inter-RAT measurement, and reference signal time difference measurement.

10. The communication system according to claim 8, wherein the first parameter is carried in any one of the following messages sent to the second network device: a terminal device context setup response message, a terminal device context modification response, and a terminal device context modification request; and
  wherein the first parameter is carried in a radio resource control reconfiguration message sent to the terminal device.

11. The communication system according to claim 8, wherein the first network device is a distributed unit (DU) and the second network device is a central unit (CU).

* * * * *